US005487925A

United States Patent [19]

Simmel et al.

[11] Patent Number: 5,487,925

[45] Date of Patent: Jan. 30, 1996

[54] ORNAMENT/DISPLAY MEMBER

[75] Inventors: Thomas L. Simmel, Milford; Robert S. McDarren, Ridgefield, both of Conn.; Joseph Truchsess, City Island, N.Y.

[73] Assignee: Link Group International, Ridgefield, Conn.

[21] Appl. No.: 384,409

[22] Filed: Feb. 6, 1995

[51] Int. Cl.$^6$ .......... B32B 3/00

[52] U.S. Cl. .......... 428/19; 428/7; 428/9; 428/10; 428/13; 428/16; 428/18; 428/20; 428/27; 428/28

[58] Field of Search .......... 428/19, 20, 18, 428/16, 9, 28, 7, 10, 27, 13

[56] References Cited

U.S. PATENT DOCUMENTS 5,006,375 4/1991 Mangan .......... 428/13
5,182,144 1/1993 Hou .......... 428/16

*Primary Examiner*—Patrick J. Ryan
*Assistant Examiner*—A. Bahta
*Attorney, Agent, or Firm*—Melvin I. Stoltz

[57] ABSTRACT

A decorative, action oriented ornament/display system is attained by providing an attention-attracting member which cooperates with a support platform or plate which is removably mounted to any limb or branch of a tree. By employing this construction, an ornament display system is realized which is quickly and easily mounted to a tree, whenever desired, or removed therefrom for display on any other surface. In the preferred embodiment, the ornament/display member incorporates interlock means formed on the support plate for removably affixing the ornament/display member to the support plate whenever desired. Furthermore, the ornament/display member also preferably incorporates a stowable hook or ring member cooperatively associated with the upper portion of the ornament/display member for enabling the ornament/display member to be affixed to a supporting branch or limb independently of the platform.

In the preferred embodiment, the ornament/display member is constructed as a bubble blowing member and incorporates circuitry for enabling the ornament/display member to be switchable between three alternate positions, an OFF position, an ON position, and a third position which engages a built-in time delay for continuously cycling between an activated and deactivated mode.

25 Claims, 2 Drawing Sheets

ORNAMENT/DISPLAY MEMBER

TECHNICAL FIELD

This invention relates to ornaments and toy-like display products and, more particularly, to dual purpose, multi-use products capable of functioning as an ornament on a tree or an interest generating, decorative display.

BACKGROUND ART

In order to enhance the holiday spirit and add excitement and interest to a holiday of joy and giving, there has been a long-standing tradition of decorating trees at holiday times, such as Christmas, in a bright, attractive, and festive manner. The tree decorations usually take various forms which include numerous ornaments that are hung on the limbs and branches of the tree in order to add to the decorative, festive appearance of the tree.

Typically, ornaments incorporate a hook, loop, or ring which allows the ornament to be mounted to the tree. Depending upon the size of the hook, loop, or ring, the tree limb is inserted through the loop to support the ornament therefrom. Alternatively, another support member, such as wire, string, hooks, and the like, are mounted to the limb and to the hook, loop, or ring of the ornament to securely affix the ornament to the tree limb.

As the interest in decorating trees in a unique and visually striking manner increased, the type of ornaments employed has been expanded. As a result, ornaments have grown from multi-colored glass spheres to more visually exciting and sensor,/stimulating constructions which include audio and visual generating components to further enhance the sensory effect.

In spite of the broad expanding nature of the type of ornaments employed for tree decorations, virtually no change has been made to the manner in which the ornament is affixed to the tree. As a result, ornaments have been limited to structures which are capable of being supported by hooks, rings, or loops which form part of the ornament. Due to this construction limitation, dual purpose ornaments for use on trees and on tables or mantels have not been realized, typically due to the unsightly nature of the limb engaging hook or ring which forms a part of the ornament.

In addition to these drawbacks, prior art systems have also been limited in size and/or weight to a structure which is capable of being supported by a single limb of the tree. Consequently, larger ornaments which may incorporate additional visually stimulating features have been incapable of being constructed for use directly on a tree as a hanging ornament due to the inability of a single tree limb to support the weight of such products.

Consequently, it is a principal object of the present invention to provide a multi-purpose, visually stimulating decorative product which can be easily and conveniently employed as a tree ornament or on a mantel or table top display.

Another object of the present invention is to provide a multi-purpose, visually stimulating display product having the characteristic features described above which incorporates a single or multiple means for providing various sensory stimulating effects while being fully supported in its entirety on any desired tree.

Another object of the present invention is to provide a multi-purpose, visually stimulating display product having the characteristic features described above which can be quickly converted from an ornament to a table display with visual observation of the product being incapable of determining the dual nature of the product when in either mode.

Other and more specific objects will in part be obvious and will in part appear hereinafter.

SUMMARY OF THE INVENTION

By employing the present invention, all of the difficulties and drawbacks found with prior art constructions are overcome and a decorative, action oriented ornament/display system is attained which is quickly and easily mounted to a tree, whenever desired, or removed therefrom for display on any other surface. The unique attributes of the ornament/display system of the present invention are realized by providing a support platform or plate which is removably mounted to any limb or branch of the tree to which the ornament/display system is to be secured. In addition, in the preferred embodiment, the ornament/display member incorporates interlock means cooperatively associated with the support plate for removably affixing the ornament/display member to the support plate whenever desired.

In this way, the ornament/display member is easily affixed to the support plate for enabling the ornament/display member to be securely mounted to the tree for use and enjoyment by individuals. In addition, if so desired, the ornament/display member can be quickly removed from the platform by disengaging the interlock means, enabling the ornament/display member to be placed in any other desired location for similar enjoyment.

In order to further enhance the stability and visually pleasing nature of the ornament/display member of the present invention, the ornament/display member also preferably incorporates a stowable hook or ring member cooperatively associated with the upper portion of the ornament/display member for enabling the ornament/display member to be affixed to a supporting branch or limb independently of the platform. If desired, the hook or ring can be used in combination with the platform, thereby attaining further enhanced stability.

In the preferred construction, the stowable hook or ring member is constructed for movement between a first stowed position and a second fully extended position, wherein the hook or ring member can be employed for providing the desired securement to the tree or limb. Furthermore, in the preferred construction, the hook or ring member is constructed to visually blend or coordinate with the outer surface of the ornament/display member. In this way, whenever the hook or ring member is in its fully stowed position, the hook or ring member is visually indistinguishable from the surrounding area.

By employing this construction, whenever the ornament/display member of the present invention is employed on a support surface, other than the limb or branch of a tree with the hook member being used for securement or stabilization, the presence of the hook member is virtually undiscoverable due to its visual concealment or coordination with the surrounding area. In this way, the visual pleasing nature of the ornament/display member is further enhanced, along with its efficacy as a surface mounted display.

The ornament/display system of the present invention, as detailed above, can be employed with virtually any desired ornament/display member which provides visually pleasing, decorative appeal. Preferably, the ornament/display member also is constructed with a particular visually pleasing action or provide audible messages when activated. In this way, further enjoyment is provided by the ornament/display member.

Although virtually any type of activity or audible message delivery system can be incorporated into the ornament/display member of the present invention, one preferred construction which provides excitement and enjoyment to individuals is the creation of an ornament/display member which represents a character blowing bubbles. In order to attain an ornament/display member of this nature, the ornament/display member is constructed with an air delivery pump and bubble creating solution delivery means movable to cooperate therewith.

In one embodiment, the ornament/display member is constructed in the form of a desired character, figure, or animal with a movable portion cooperatively associated with a wand or ring which is movable between a first position, with the wand or ring submerged in a bubble making solution, and a second position in which the bubble blowing material retained in the wand or ring is cooperatively associated with the air delivery pump to create a plurality of bubbles. By employing this construction, a unique, visually distinctive and interest-generating ornament/display system is realized which can either be mounted on any desired surface or supportingly retained on any tree, limb, or branch, providing continuous bubble blowing action for delighting and enhancing viewer interest and excitement.

In the preferred embodiment, the ornament/display member of the present invention, when constructed as a bubble blowing member, also incorporates circuitry for enabling the ornament/display member to be switchable between three alternate positions. In the preferred embodiment, these alternate positions comprise an OFF position, wherein no activity is provided, an ON position, wherein bubbles are continuously blown by having the movable portion of the ornament/display member being continuously raised and lowered between its two alternate positions, and a third switch position which engages a built-in time delay for continuously cycling between an activated and deactivated modes, in a desired, preset manner.

Preferably, the delay mechanism is constructed to automatically allow the ornament/display member to run for a particular desired period of time, such as between about five seconds and sixty seconds, and then be stopped for a pre-selected period of time, at the conclusion of which the cycle is repeated. In this way, further enhanced enjoyment of the ornament/display member of the present invention is realized.

The invention accordingly comprises an article of manufacture possessing the features, properties, and the relation of elements which will be exemplified in the article herein after described and the scope of the invention will be indicated in the claims.

THE DRAWINGS

For a fuller understanding of the nature and objects of the invention, reference should be had to the following detailed description, taken in connection with the accompanying drawings, in which.

DETAILED DESCRIPTION

Figure 1:
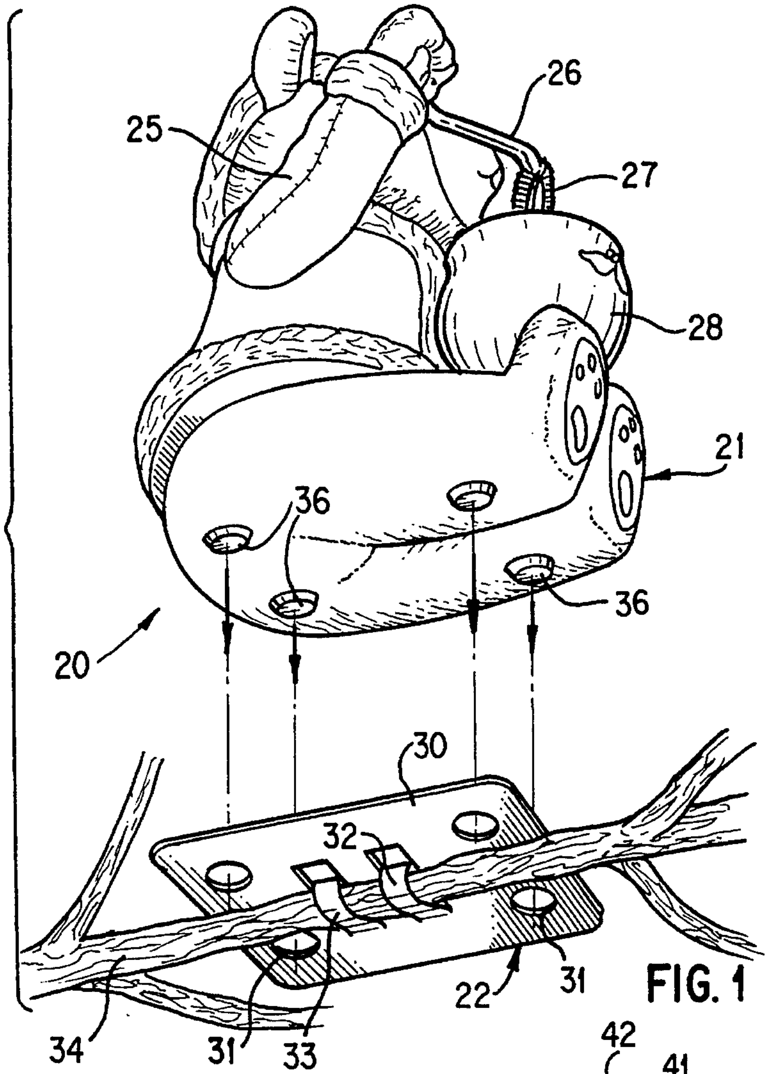
FIG. 1 is a partially exploded perspective view of one embodiment of the ornament/display system of the present invention depicting the ornament/display member cooperatively associated with a support platform mounted in a tree limb or branch.

In FIGS. 1–6, one preferred construction for the ornament/display member of the present invention is fully detailed. However, as will be evident from the following detailed disclosure, the present invention may be implemented in a variety of alternate constructions and configurations. Consequently, it is intended that the embodiment detailed herein shall be considered as exemplary of the present invention, with all alternate embodiments coming within the scope of this invention.

In FIG. 1–5, ornament/display system 20 of the present invention is depicted as comprising an ornament/display member 21 and a limb or branch engaging support plate 22. In the embodiment depicted, ornament/display member 21 is constructed in the form of a bear in a sitting position. However, it is understood that ornament/display member 21 may comprise any other character, animal, figure, or item without departing from the scope of the present invention.

In order to add further interest and excitement to ornament/display system 20 of this invention, ornament/display member 21 is constructed as an aesthetically pleasing bear-like character which is capable of automatically blowing bubbles in a continuous or intermittent manner, whenever desired by the user. In this way, an extremely pleasing and interest generating ornament/display member is realized.

In order to attain the desired bubble-blowing capabilities, ornament/display member 21 incorporates air delivery means (not shown) contained within ornament/display member 21, which is constructed for providing a continuous stream of air. In this embodiment, the air stream is constructed to emanate from mouth 24 of ornament/display member 21.

In the preferred embodiment, as depicted in FIGS. 1–5, ornament/display member 21 incorporates a movable arm 25 within which is mounted a wand 26 having a circular-shaped ring 27 at the distal end thereof. In addition, ornament/display member 21 incorporates a liquid holding vessel 28 positioned in cooperating relationship with wand 26 and ring 27.

In order to provide the desired continuous bubble production stream, when desired, liquid holding vessel 28 is filled with a bubble blowing liquid and movable arm 25 is connected to a drive motor for arcuately raising and lowering movable arm 25 between a first position, wherein ring 27 is positioned within liquid holding vessel 28 and a second position wherein movable arm 25 is raised to bring ring 27 into juxtaposed spaced cooperating relationship with mouth 24 of ornament/display member 21. By employing this construction, the placement of ring 27 in the bubble blowing solution contained in liquid holding vessel 28 causes a portion of the liquid to remain within the inside aperture formed by ring 27. When ring 27 is brought into juxtaposed, spaced, cooperating relationship with mouth 24 of ornament display member 21, with the stream of air emanating from mouth 24, the air flow causes the bubble blowing solution contained within ring 27 to produce a continuous stream of bubbles, until either the liquid is consumed or ring 27 is moved downwardly into its original position.

As long as the drive motor is activated, arm 21 is continuously raised and lowered between its two alternate positions, causing a stream of bubbles to be repeatedly produced, each and every time ring 27 is brought into juxtaposed, spaced, cooperating relationship with mouth 24. In this way, a unique, visually exciting, stimulating and interest-generating ornament/display member is attained and substantial enjoyment and enhanced benefit is provided.

As discussed above, in order to enable ornament/display member 21 to provide optimum enjoyment and entertainment to the observers thereof, ornament/display member 21 is constructed as a principal component of ornament/display system 20 which enables ornament/display member 21 to be positioned on either any substantially flat surface or, if desired, on the limb or branch of any tree, such as a Christmas Tree, for providing a unique, exciting, and interest-generating ornament therefor.

In order to enable ornament/display member 21 to be mountable on any substantially flat surface for providing the desired bubble blowing bear character in any desired location, a generally conventional construction is employed. However, in order to attain the dual positioning of ornament/display member 21 and enable ornament/display member 21 to also be securely mounted to any desired limb or branch of a tree, while also providing the visually exciting and interest generating bubble blowing capabilities, a unique mounting system has been developed.

Figure 2:
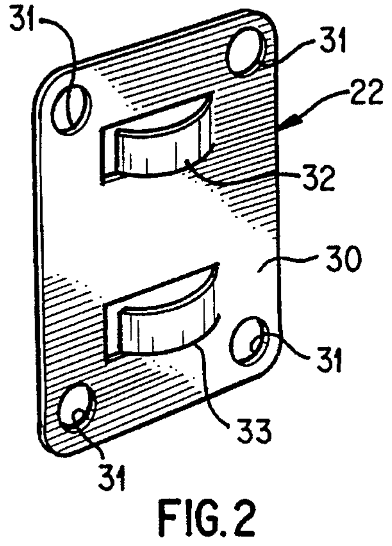
FIG. 2 is a perspective view of the support platform shown in FIG. 1.

As shown in FIGS. 1 and 2, ornament/display system 20 incorporates a limb or branch engaging support plate 22 as one of its principal components. In its preferred construction, limb or branch engaging support plate 22 comprises an enlarged, substantially flat base 30, comprising an overall size and shape substantially equivalent to the size and shape of the bottom portion of ornament/display member 21. In addition, a plurality of apertures 31 are formed in base 30 along with at least two elongated, flexible fingers or clips 32 and 33.

In the preferred construction, each flexible finger 32 and 33 incorporates a proximal end which is integrally connected to base 31 and a distal, free end, disconnected from base 30. In addition, in the preferred construction, flexible fingers or clips 32 and 33 are formed in a substantially arcuate or curved configuration, in order to enhance the ability of flexible fingers 32 and 33 to peripherally surround and securely embrace the rounded surface of any desired branch or limb.

As depicted in FIG. 1, support plate 22 is quickly and easily mounted to any desired tree limb or branch 34 by sliding a portion of the tree limb or branch 34 between base 30 and the distal ends of clips 32 and 33. In this way, clips 32 and 33 peripherally surround and embrace a portion of branch 34, while base 30 is mounted to the top portion thereof. By adjusting base 30 about the central axis of limb 34, the precisely desired orientation of base 30 relative to limb or branch 34 is easily attained.

In order to assure that ornament/display member 21 is securely mountable to support plate 22 for positioning and securely maintaining ornament/display member 21 on limb or branch 34, interlock means are employed. Although a plurality of alternate constructions may be used for attaining suitable interlock means, one simple and effective interlock assembly is attained by forming apertures 31 in base 30 for use with corresponding bosses 36 formed on the base of ornament/display member 21. By providing ornament/display member 21 with a plurality of bosses 36 extending from the bottom surface thereof, with each of bosses 36 being positioned for cooperative, telescopic, interengagement with an aperture 31 of base 30, the precisely desired position and interengaged relationship of ornament/display member 21 with base 22 is easily attained.

In the preferred embodiment, each boss 36 of ornament/display member 21 is constructed with a generally narrowing or tapered configuration, with the taper ranging from a diameter smaller than the diameter of aperture 31 to a diameter which is substantially equal to or slightly greater than the diameter of aperture 31. By constructing each boss 36 in this manner, with the larger diameter of each boss being directly adjacent the bottom surface of ornament/display member 21, assurance is provided that each boss 36 is easily placed in telescopic interengagement with support plate 22 and advanced into engagement therewith until the larger diameter of boss 36 is brought into contacting interengagement with the diameter of aperture 31. In this way, secure interengagement of ornament/display member 21 with support plate 22 is realized in an easily attained, efficient manner.

Figure 5:
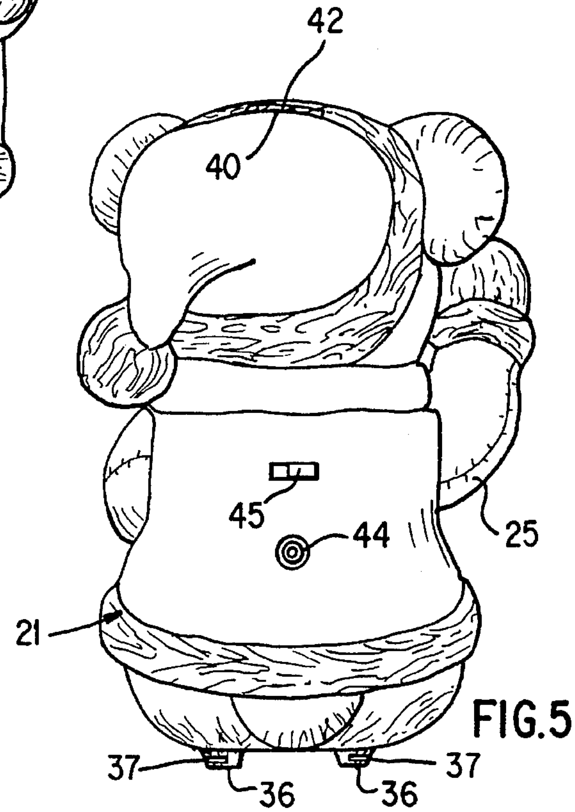
FIG. 5 is a rear elevation view of the ornament/display member of the present invention.

If desired, alternate locking means can be employed for further enhancing or securely affixing ornament/display member 21 with base 22. As shown in FIG. 5, one such alternate configuration is shown wherein boss 36 of ornament/display member 21 is constructed with a groove formed therein which can be advanced into locked interengagement with the side wall of aperture 31. By employing this alternate construction, locked interengagement of ornament/display member 21 with support plate 22 is also assured.

Figure 3:
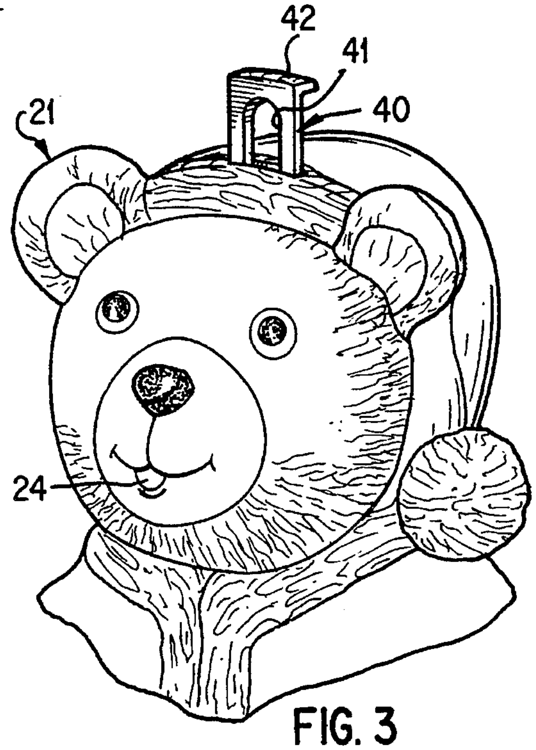
FIG. 3 is a perspective view, partially broken away, of the ornament/display member of the present invention depicting a stowable hook member in its fully raised position.
Figure 4:
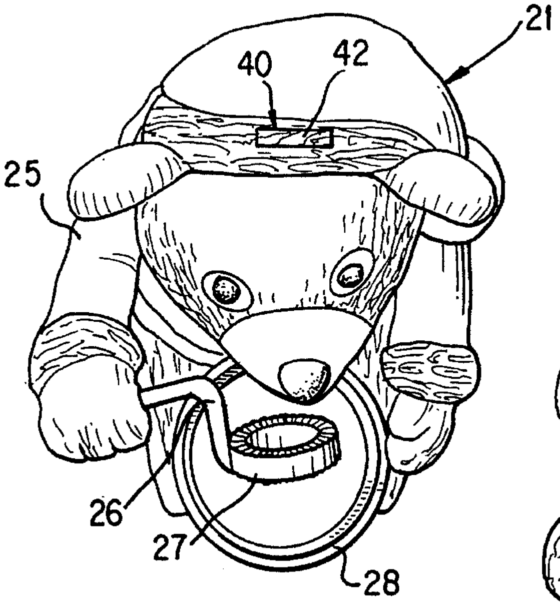
FIG. 4 is a top plan view of the ornament/display member of the present invention.

In order to further enhance the visually pleasing, aesthetic nature of ornament/display member 21 of the present invention, as well as enable the ornament/display member 21 to be fully and completely supported on any desired branch or limb of a tree, ornament/display member 21 also incorporates a stowable bracket 40, preferably mounted at the top of ornament/display member 21. As best seen in FIGS. 3, 4, and 5, stowable bracket 40 is movable between two alternate positions.

In one position, as shown in FIG. 3, bracket 40 is fully extended from the top of ornament/display member 21, exposing elongated slot 41 formed therein. In its alternate position, as shown in FIGS. 4 and 5, bracket 40 is fully stowed within ornament/display member 21 in visually blended cooperation with the outer surface of ornament/display member 21.

By employing stowable bracket 40, secure, mounted engagement of ornament/display member 21 in any desired tree is enhanced and assured. In one application, ornament/display member 21 is mounted in interengagement with support plate 22, as detailed above. Then, in order to further assure trouble-free secure placement and positioning of ornament/display member 21 in the precisely desired orientation, stowable bracket 24 is raised to its fully extended position, enabling conventional fastening means, such as string, hooks, etc. to be inserted in slot 41 and tied to a second branch or limb of the tree, securing and stabilizing ornament/display member 21 in the precisely desired position. By employing stowable bracket 40 in this manner, assurance is provided that ornament/display member 21 is securely retained in the precisely desired location, able to provide the desired visual effect and to freely operate, blowing bubbles whenever desired.

In an alternate use, stowable bracket 40 is employed for securely mounting ornament/display member 21 to a desired limb or branch without employing support plate 22. If a suitable branch is found which is capable of fully supporting ornament/display member 21, without the use of support plate 22, the desired fastening means is inserted through slot 41 of bracket 40 and secured to the desired branch. In this way, ornament/display member 21 is quickly and easily secured to the branch using only stowable bracket 40. In this way, quick, easy mounted securement of ornament/display member 21 to any desired limb or branch is achieved.

In order to further enhance the aesthetically pleasing nature of ornament/display member 21 of the present invention, stowable bracket 40 is movable from its fully extended position, as shown in FIG. 3, to its fully retracted position as depicted in FIGS. 4 and 5. Furthermore, top surface 42 of bracket 40 is preferably constructed with a surface visually identical to the surface treatment of the area surrounding surface 42. As a result, when bracket 40 is in its fully stowed position, bracket 40 is virtually undetectable, since surface 42 of bracket 40 visually blends with the surrounding area.

In this way, the presence of bracket 40, when not employed, is visually undetectable, enabling ornament/display member 21 to possess an aesthetically pleasing, visual appearance, substantially enhanced by eliminating the presence of unsightly conventional brackets or hooks commonly found with prior art ornament structures. As a result, ornament/display member 21 is substantially more effective as a display for any surface, without being immediately recognizable as an ornament for mounting to a tree limb.

In detailed above, ornament/display member 21 is preferably constructed in the form of a bear having a movable arm capable of continuously blowing bubbles whenever ring 27 of wand 26 is moved into cooperating position with the stream of air emanating from mouth 24 of ornament/display member 21. In order to provide the desired electrical power to motor means contained within ornament/display member 21 which moves arm 25 and creates the desired flow of air, ornament/display member 21 incorporates a socket 44, which is constructed for receiving a conventional power delivery plug.

Furthermore, ornament/display member 21 incorporates switch means 45, preferably mounted directly adjacent socket 44 for enabling the user to control the operation of ornament/display member 21. In order to provide the desired operation, switch means 45 typically comprises the ability to activate and de-activate the motor means to attain the desired bubble-blowing effect, whenever desired. In addition, switch means 42 stops the bubble-blowing effect whenever bubble-blowing presentation is no longer desired.

In the preferred embodiment, ornament/display member 21 of the present invention incorporates circuitry for controllably operating ornament/display member 21 in an automatic, repeatable on/off cycle or delay mode. In this mode, the bubble blowing capability of ornament/display member 21 automatically cycles between an activated and de-activated state, with each state having a predetermined length of time associated therewith. In addition, in this preferred construction, switch means 45 comprises three alternate positions, enabling the user to select between OFF, ON, and AUTOMATIC DELAY.

Figure 6:
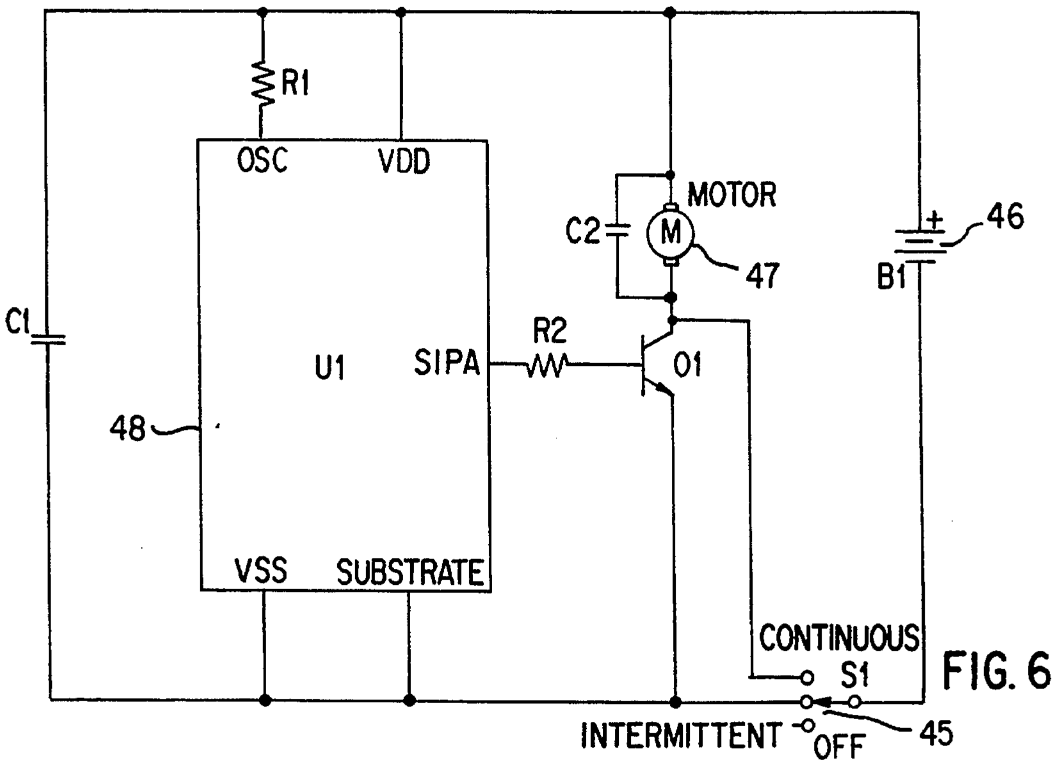
FIG. 6 is a schematic diagrammatic view of the control circuitry employed for operating the ornament/display member of the present invention.

In FIG. 6, the preferred circuitry for providing the operation capabilities detailed above is shown. Although this circuitry is preferred, alternate circuit constructions can be employed, without departing from the scope of this invention.

As shown in FIG. 6, the preferred construction incorporates switch 45 which is connected to power source 46 and motor 47. As detailed above, switch 45, when in its OFF position, has power source 46 and motor 47 disconnected, preventing any action from occurring. However, whenever switch 45 is moved into the continuous mode or "ON", power source 46 is connected directly to motor 47, enabling ornament/display member 21 to continuously operate, producing the desired bubble blowing visual effect.

Finally, whenever switch 45 is moved into its third alternate position, the remainder of the circuitry, depicted in FIG. 6, is controllably connected between power source 46 and motor 47. In this mode, printed circuit 48 is interconnected with power source 46 and motor 48, enabling the circuitry of printed circuit 48 to be activated to, provide the desired automatic operational cycling.

Printed circuit 48 contains clock means for continuously cycling between a power ON and power OFF operational state. In addition, the length of time for each cycle can be altered, depending upon the effect desired. Preferably, time periods ranging between about 2 seconds and 5 minutes are employed for the power ON mode or the power OFF mode. However, any desired delay period can be incorporated into the circuitry.

Once the desired time periods have been established for the operation of printed circuit 48, the selection of the intermittent time delay mode automatically causes the circuitry depicted in FIG. 6 to continuously activate motor 47 for the first predetermined time period, followed by the second predetermined time period in which motor 47 is de-activated. Thereafter, the cycle is continuously repeated until switch means 45 is switched to its OFF position.

Whenever switch means 45 is moved into its intermittent or delay mode, ornament/display member 21 operates to produce bubbles during the first activated time period and then automatically stops the bubble blowing movement for the second time period. Thereafter, the motor is re-activated and the cycle is repeated. In this way, added visual interest and excitement is provided to the system, enabling the system to provided added enjoyment to all users and observers thereof.

In the preferred embodiment, integrated circuit 48 comprises a low-cost voice chip which is employed to provide the time delay functions detailed above. Although various other clock providing circuits can be employed, it has been found that by using the preferred voice chip for integrated circuit 48, an extremely low cost and highly effective construction is realized.

In the preferred embodiment, integrated circuit 48 comprises integrated circuit-W52503 manufactured by Winbond Electronics of Taiwan. Although the circuit is constructed for providing a playback of voice or sounds, this circuitry incorporates a programmable microprocessor enabling the desired time delay functions to be achieved by adjusting the master clock forming a part of integrated circuit 48. By providing the desired oscillation input at pin "OSC", any desired time period ranging between 0.1 seconds and several days can be obtained for either the active cycle or for the inactive cycle.

Although a wide variety of integrated circuits can be employed in order to attain the desired multi-faceted operation for ornament/display member 21, the use of the circuitry shown in FIG. 6, along with integrated circuit 48 comprising a voice chip is preferred for attaining the most effective operation at the least expensive cost. However, although this circuitry is preferred, any other circuit capable of providing a similar function can be employed without departing from the scope of this invention.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim is new and desired to secure by Letters Patent is:

1. A decorative, exciting ornament/display system constructed for being positioned and securely retained on a conventional support surface and on a branch of a tree, said ornament/display system comprising A. an attention attracting member
   a. constructed to produce at least one function selected from the group consisting of automated visually stimulating movements and presentation of audible and reproducible sounds or messages, and
   b. designed for enhancing the appearance and festive decorative effect provided by the member and the area with which the member is associated; and B. a support plate securely mountable to a limb of a tree and comprising
   a. engagement clip means constructed for being removably securely interengaged with a portion of a tree limb for securely affixing the plate to the limb when desired, and
   b. securement means formed on the plate for cooperative locking interengagement with the interest generating member for securing the member to the plate when desired;

whereby a decorative, exciting ornament/display system is realized which enables an attention attracting member to be quickly and easily mounted to a supporting plate affixed to a tree limb for displaying the member as a part of the tree, as well as enabling the member to be removed from the plate, whenever desired, for displaying the member in any other desired location.

2. The ornament/display system defined in claim 1, wherein said engagement means is further defined as comprising at least two elongated clip members mounted to the support plate and extending therefrom for cooperative, removable, interengageable mounted interconnection with a portion of any desired tree limb.

3. The ornament/display system defined in claim 2, wherein said attention attracting member is further defined as comprising a plurality of locking protrusions or bosses extending from one surface thereof, each being positioned for cooperative alignment with the support plate, and the securement means of said support plate are further defined as comprising a plurality of protrusion receiving recesses formed therein constructed for secure interconnected interengagement therewith, for affixing the display member to the support plate when desired.

4. The ornament/display system defined in claim 3, wherein said support plate is further defined as comprising a substantially flat, generally rectangular shape dimensioned for embracing and securely supporting one surface of said display member.

5. The ornament/display system defined in claim 1, wherein said attention attracting member is further defined as comprising a movable hook member mounted to one surface thereof and positioned for cooperative mounted interengagement with a second limb of the tree.

6. The ornament/display system defined in claim 5, wherein said movable hook member is further defined as
   a. being movable between a first stowed position and a second raised position wherein said hook member is fully exposed and capable of being employed for securement to a tree limb, and
   b. comprises a top surface constructed for being visually identical to the surface surrounding said hook means for enabling said hook means, when in its first stowed position, to be visually undetectable, thereby providing a display member having hook means capable of being stowed in a visually unobtrusive manner.

7. The ornament/display system defined in claim 6, wherein said stowable hook member is further defined as comprising
   c. a substantially U-shape formed by integrally connecting two juxtaposed, spaced, facing side rails with the top surface,
   d. forming an apertured slot between said side rails,
   e. affixing the terminating ends of the rails to the display member for preventing removal of the hook member therefrom, and
   f. movable from the fully extended position to the stowed position wherein said side rails are retained within the display member and are incapable of being seen by the user.

8. The ornament/display system defined in claim 1, wherein said attention attracting member is further defined as being formed to visually represent one selected from the group consisting of animals, characters, and objects constructed to provide the audible or visual function upon demand.

9. The ornament/display system defined in claim 8, wherein said attention attracting member is further defined as being constructed to produce a stream of bubbles in a continuously repeating manner when activated.

10. The ornament/display member defined in claim 1, wherein said member is further defined as comprising C. means for producing a stream of bubbles in a continuously repeating manner, and D. a control circuit for enabling the activation and deactivation of the bubble producing means, said control circuit also incorporating clocking means for providing an automatic, continuously repeating ON and OFF cycle.

11. The ornament/display system defined in claim 10, wherein said clocking circuit is further defined as being formed in an audio delivery integrated circuit chip, with said clock functions being connected to provide the desired pre-timed activation and deactivation cycles.

12. The ornament/display system defined in claim 10, wherein said clocking means is further defined as being controllably varied to enable the activated mode and deactivated mode to comprise any desired duration.

13. An ornament stabilizer for securely supportingly maintaining an ornament on a tree limb, said ornament stabilizer comprising A. an ornament support plate constructed for cooperative supporting engagement with an ornament;

B. interlock means formed on the support plate and constructed for providing removable interlocked secure engagement of the ornament with the support plate; and C. tree engagement means formed on the support plate and constructed for removable interengagement with a portion of any desired limb of a tree;

whereby any desired ornament is capable of being securely mounted to the limb of the tree while securely interlocking and supportingly maintaining the ornament on the support plate.

14. The ornament stabilizer defined in claim 13, wherein said tree engagement means is further defined as comprising at least two elongated clip members mounted to the support plate and extending therefrom for cooperative, removable, interengageable mounted interconnection with a portion of any desired tree limb.

15. The ornament stabilizer defined in claim 14, wherein the interlock means of said support plate are further defined as comprising a plurality of protrusion receiving recesses formed therein, constructed for secure interconnected interengagement therewith, for affixing a cooperating display member to the support plate.

16. A decorative, exciting ornament/display member constructed for being mounted to the limb of a tree, comprising A. at least one attention attracting function selected from the group consisting of automated visually stimulating movements and presentation of audible and reproducible sounds or messages, B. a design for enhancing the appearance and festive decorative effect provided by the member, and C. a movable hook member mounted to one surface of the ornament/display member a. movable between a first stowed position and a second raised position wherein said hook member is fully exposed and capable of being employed for securement to a tree limb, and b. comprising a top surface constructed for being visually identical to the surface surrounding said hook means for enabling said hook means, when in its first stowed position, to be visually undetectable, providing a display member having hook means capable of being stowed in a visually unobtrusive manner.

17. The ornament/display member defined in claim 16, wherein said stowable hook member is further defined as comprising c. a substantially U-shape formed by integrally connecting two juxtaposed, spaced, facing side rails with the top surface, d. forming an apertured slot between said side rails, e. affixing the terminating ends of the rails to the display member for preventing removal of the hook member therefrom, and f. movable from the fully extended position to the stowed position wherein said side rails are retained within the display member and are incapable of being seen by the user.

18. The ornament/display member defined in claim 16, wherein said member is further defined as being formed to visually represent one selected from the group consisting of animals, characters, and objects constructed to provide the audible or visual function upon demand.

19. The ornament/display system defined in claim 18, wherein said attention attracting member is further defined as being constructed to produce a stream of bubbles in a continuously repeating manner when activated.

20. The ornament/display member defined in claim 16, wherein said member is further defined as comprising D. means for producing a stream of bubbles in a continuously repeating manner, and E. a control circuit for enabling the activation and deactivation of the bubble producing means, said control circuit also incorporating clocking means for providing an automatic, continuously repeating ON and OFF cycle.

21. The ornament/display system defined in claim 20, wherein said clocking circuit is further defined as being formed in an audio delivery integrated circuit chip, with said clock functions being connected to provide the desired pre-timed activation and deactivation cycles.

22. The ornament/display system defined in claim 20, wherein said clocking means is further defined as being controllably varied to enable the activated mode and deactivated mode to comprise any desired duration.

23. A decorative, exciting ornament/display member comprising

A. at least one attention attracting function selected from the group consisting of automated visually stimulating movements and presentation of audible and reproducible sounds or messages, B. a design for enhancing the visual appearance and festive decorative effect provided by the member, C. means for producing a stream of bubbles in a continuously repeating manner, and D. a control circuit a. constructed for enabling the activation and de-activation of the bubble producing means whenever desired, and b. incorporating clocking means for enabling the selection of a delay cycle which produces an automatic, continuously repeating ON and OFF cycle.

24. The ornament/display system defined in claim 23, wherein said clocking means is further defined as being formed in an audio delivery integrated circuit chip, with said clock functions being connected to provide the desired pre-timed activation and deactivation cycles.

25. The ornament/display system defined in claim 24, wherein said clocking means is further defined as being controllably varied to enable the activated mode and deactivated mode to comprise any desired duration.

* * * * *